United States Patent [19]
Ronchi

[11] Patent Number: 6,062,278
[45] Date of Patent: May 16, 2000

[54] MACHINE FOR FILLING CONTAINERS PROVIDED WITH AUTOMATIC DEVICES FOR RAPIDLY LOCKING/RELEASING THE INTERCHANGEABLE ELEMENTS GUIDING AND MOVING THE CONTAINERS THEMSELVES

[75] Inventor: Mario Ronchi, Cologno Monzese, Italy

[73] Assignee: Ronchi Mario S.R.L., Gessate, Italy

[21] Appl. No.: 09/074,965

[22] Filed: May 8, 1998

[30]     Foreign Application Priority Data

May 22, 1997   [IT]   Italy ................................ MI97A1200

[51] Int. Cl.⁷ ........................................ B65B 1/04
[52] U.S. Cl. ........................ 141/373; 141/177; 141/179; 141/378; 198/473.1
[58] Field of Search ...................... 141/177, 179, 141/373, 378; 198/473.1, 478.1, 479.1, 480.1, 481.1, 803.11; 414/222, 225

[56]             References Cited

U.S. PATENT DOCUMENTS 5,046,599   9/1991   Hamano ............................... 198/481.1
5,082,105   1/1992   Tincati ................................. 198/473.1
5,394,975   3/1995   Bernhard ............................. 198/473.1
5,540,320   7/1996   Sarto et al. .
5,607,045   3/1997   Kronseder ............................ 198/473.1

FOREIGN PATENT DOCUMENTS 0 629 569   12/1994   European Pat. Off. .
0 316 001   5/1989    Germany .
WO 94/16976   8/1994   WIPO .

*Primary Examiner*—Steven O. Douglas
*Assistant Examiner*—Timothy L. Maust
*Attorney, Agent, or Firm*—Herbert Dubno

[57]             ABSTRACT

Machine for filling containers (2) comprising a base (1a) and interchangeable elements for guiding (3) and moving (4) the said containers (2), which are supported by columns (11) joined to said base (1c), characterized in that it comprises automatic devices (10) for rapidly locking/releasing the said guiding and moving elements (3,4), which are coaxially inserted inside said support columns (11) and act on means (7;107) fixed to the said guiding and moving elements (3,4).

17 Claims, 3 Drawing Sheets

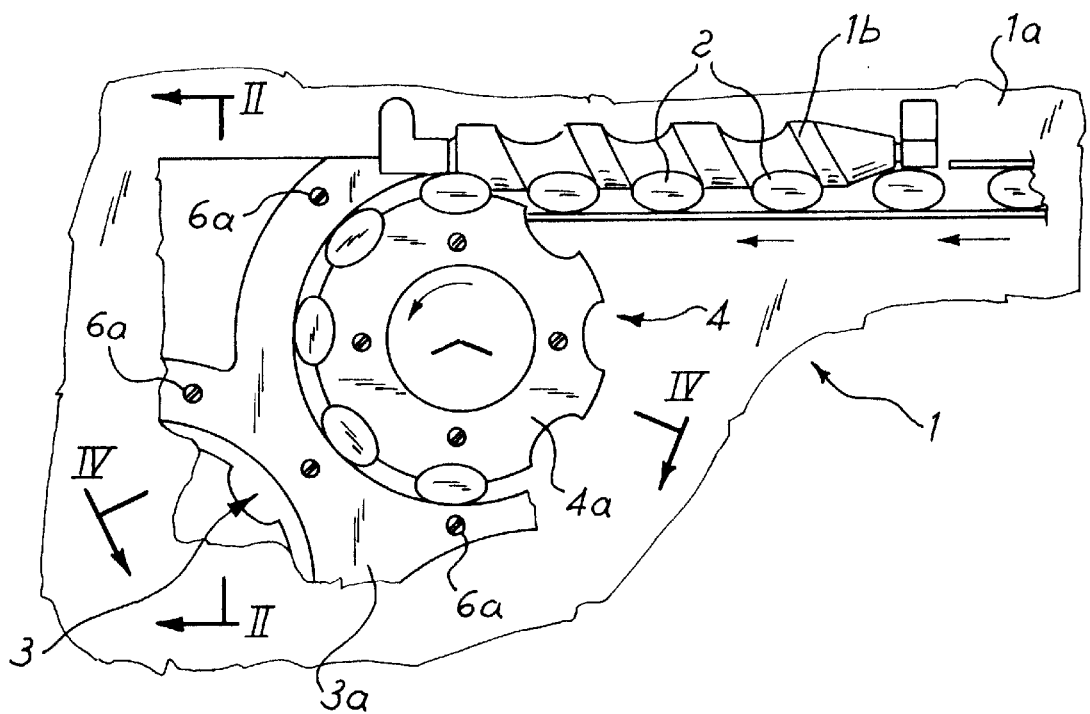
Fig. 1
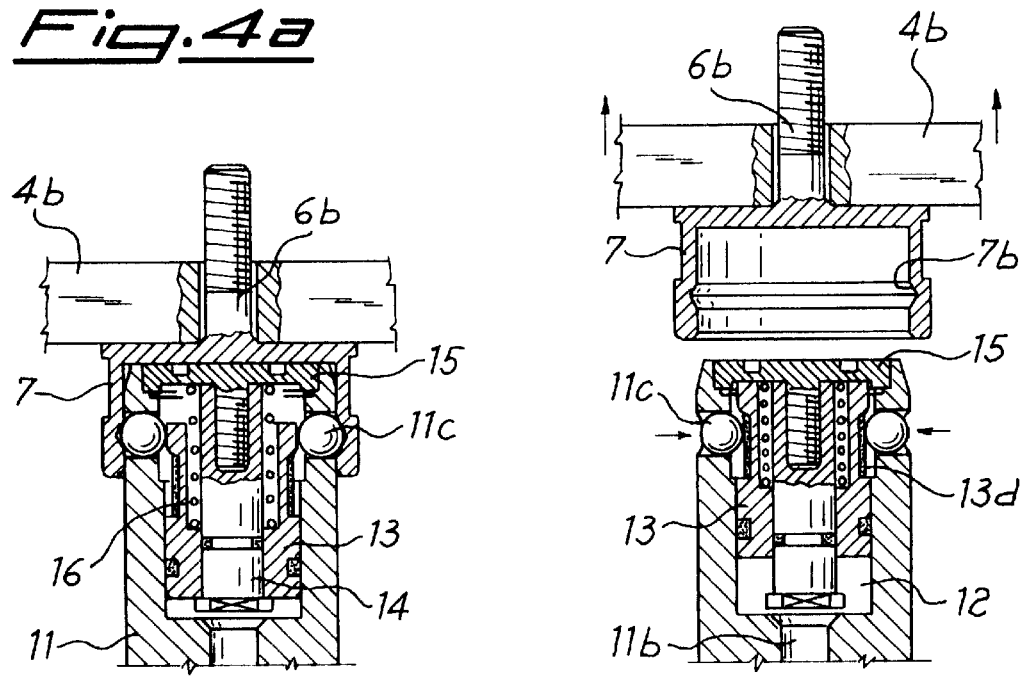
Fig. 4a
Fig. 4b

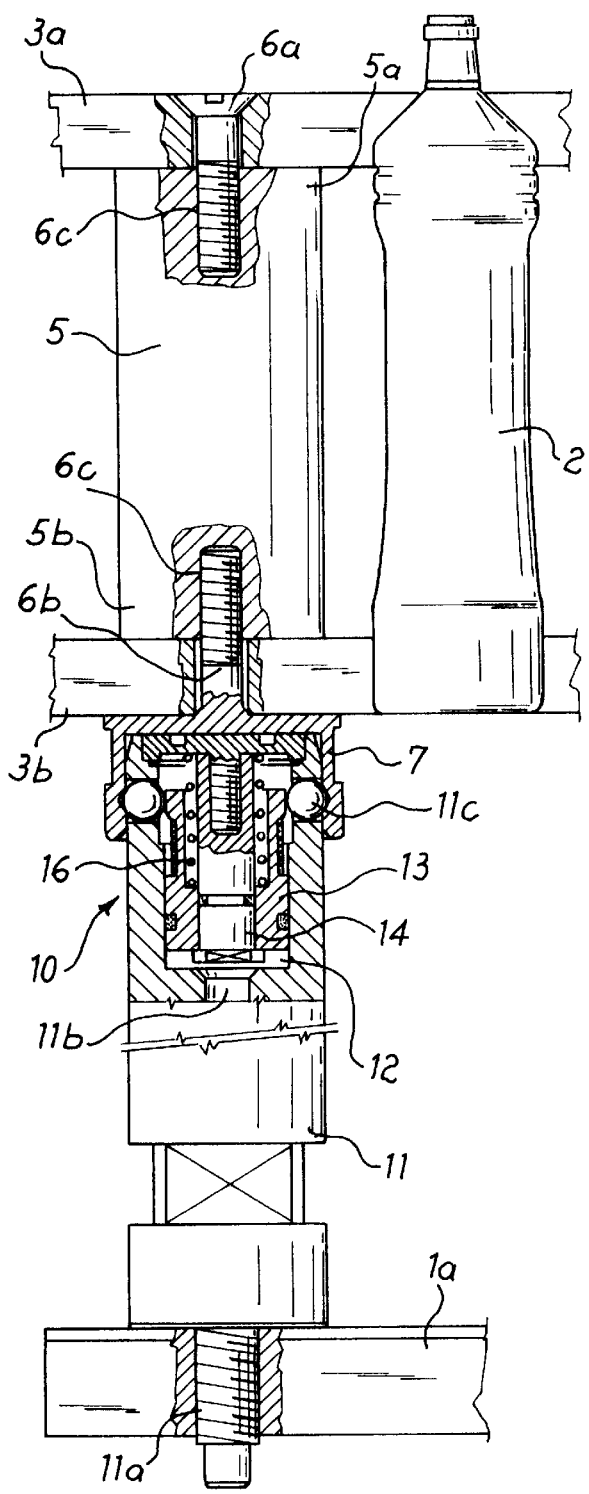
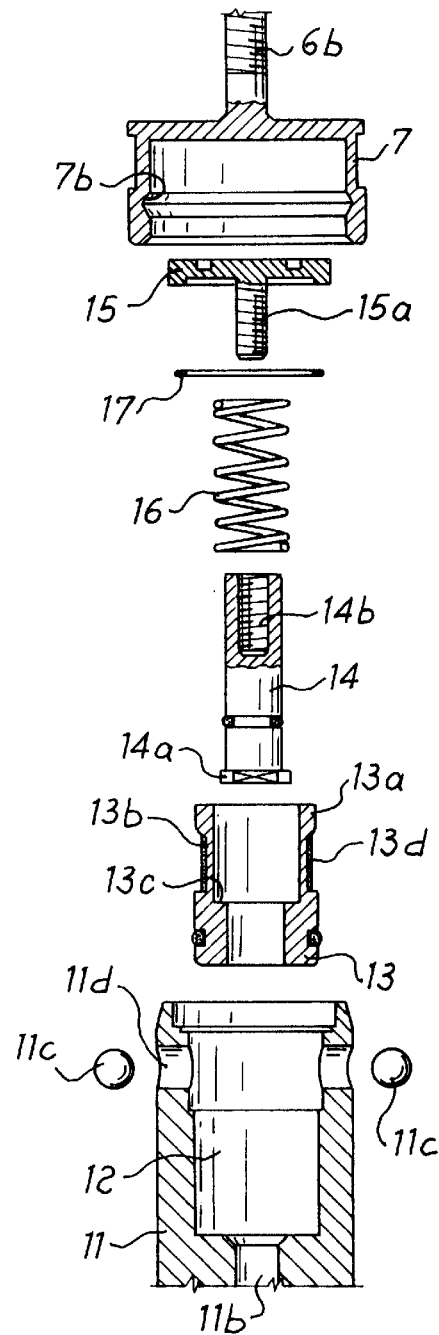

MACHINE FOR FILLING CONTAINERS PROVIDED WITH AUTOMATIC DEVICES FOR RAPIDLY LOCKING/RELEASING THE INTERCHANGEABLE ELEMENTS GUIDING AND MOVING THE CONTAINERS THEMSELVES

FIELD OF THE INVENTION

The present invention relates to a machine for filling containers such as bottles, vials and the like, which is provided with automatic devices for rapidly locking/releasing the interchangeable elements guiding and moving the said containers in the machine.

BACKGROUND OF THE INVENTION

It is known that in the art of constructing automatic machines for filling and sealing containers such as bottles, vials and the like, there is a need to adapt, to the various shapes and sizes of the containers, the guiding and moving means which remove the containers from the conveyor belts and channel them towards and away from the filling and sealing carousels and from the latter towards the machine exit point.

In other words, it is known that there is the need to perform retooling of the machine every time the shape and/or size of the container varies beyond certain predetermined tolerance limits.

It is also known that in such machines the moving and guiding means essentially consist of rotating disks, commonly called star wheels, which have formed in them recesses of the shape of the containers, and stationary guides, which are situated opposite to the star wheels with respect to the conveyor belt, commonly called bows or outer guides.

Both the guiding and moving elements are fixed to the base of the machine by means of screws elements which are manually fixed onto corresponding internal threads formed inside spacing columns or rotating shafts for moving the star wheels, joined to the base of the machine.

In view of the large number of screws which have to be unscrewed and tightened up each time the machine is retooled and in view of the fact that this operation is performed manually, downtimes occur in the cycle, which are incompatible with the production speeds required and with the capacity of the machine to maintain these speeds once they are up to running speed.

OBJECTS OF THE INVENTION

It is another object to provide an automatic machine for filling and/or sealing containers, which is provided with devices for rapidly engaging/disengaging the elements supporting and fixing the elements guiding and moving the containers, in order to reduce the downtime of the machine necessary for retooling thereof when there is a variation in the shape and/or size of the bottles to be processed.

It is another object to provide rapid engaging/disengaging means which can be operated all at the same time by a central control unit and can be installed on machines of the known type without the need for special adaptations.

SUMMARY OF THE INVENTION

In addition to this, it is also required that said means should be simple and economical to manufacture and assemble and should not require special maintenance operations.

These technical problems are solved according to the present invention by a machine for filling containers, comprising a base and interchangeable elements for guiding and moving the said containers, which are supported by columns joined to the base, the machine comprising automatic devices for rapidly locking/releasing the said guiding and moving elements, which are coaxially inserted inside the support columns and act on means fixed to the said guiding and moving elements.

BRIEF DESCRIPTION OF THE DRAWING

The above and other objects, features, and advantages will become more readily apparent from the following description, reference being made to the accompanying drawing in which:

FIG. 1 shows a plan view of a part of a filling machine according to the invention;

FIG. 2 shows a cross-section along the plane II—II in FIG. 1;

FIG. 2a shows an exploded view of the device for retaining the interchangeable element;

SPECIFIC DESCRIPTION

Figure 3:
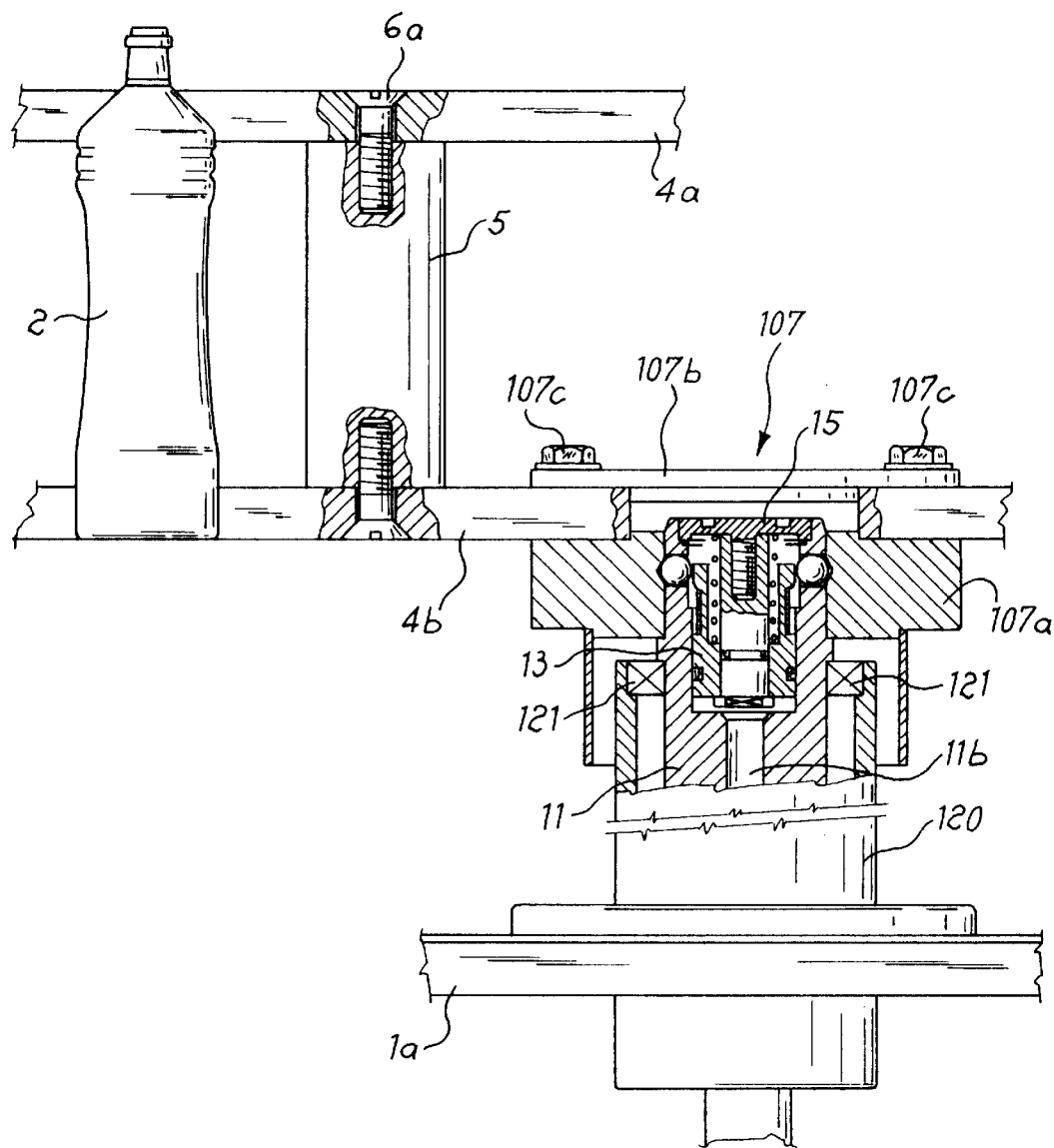
FIG. 3 shows a cross-section along the plane III—III in FIG. 1.

FIGS. 4a,4b show a detail of the retaining device during engagement and disengagement, respectively.

As illustrated in FIG. 1, the filling machine 1 which is known per se is schematically shown with its bottom surface 1a on which an auger 1b for supplying the bottles 2, stationary guiding elements 3 and rotating star wheels 4 for moving the bottles are mounted.

More particularly, the guides 3 and the star wheels 4 consist of two parallel surfaces 3a, 3b and 4a, 4b which are suitably shaped and connected together by spacers 5, the opposite ends 5a,5b of which are connected to the respective surfaces by means of fastening systems in the form of a screw 6a,6b and a female thread 6c.

As can be seen from the Figures, while the top screw 6a is of the normal type, the bottom screw 6b has a head formed by a cup 7 which has, in its internal surface, an annular groove 7b designed to form the element for engagement with balls 11c forming part of the locking device 10 described below.

Advantageously, the annular groove 7b has inclined as to favor supporting of the balls and 110 convert the radial thrust thereof into an axial thrust.

The locking device consists of a column 11 joined via screw means 11a to the surface 1a of the machine 1; the column 11 has, formed inside it, a coaxial duct 11b for supplying air under pressure from the centralized devices of the machine.

The duct 11b emerges inside a chamber 12 forming a cylinder which houses internally, in a movable and sealed manner, a piston 13, the external surface of which has an annular shoulder 13a and below this an inset seat 13b.

As will emerge more clearly below, the shoulder and seat are designed to co-operate with said balls 11c housed in corresponding radial holes 11d in the side surface of the cylinder 11.

The piston 13 is in turn hollow so as to allow the insertion inside it, in a sealed manner, of a piston pin 14 having an abutment head 14a for preventing the relative movement thereof with respect to the piston 13.

The piston pin 14 has an internal female thread 14b, which is designed for engagement with the threaded shank 15a of a disk-shaped piece 15, forming one of the two reaction surfaces of a spring 16 which is arranged coaxially outside the piston pin 14. On the opposite side said spring acts on an abutment surface 13c inside the piston 13.

The disk-shaped piece 15 also forms the element for the upper closing of the cylinder 11 and is fastened thereto by means of a Seger ring 17.

As illustrated in FIG. 3, if the locking device is applied to a rotating element such as the star wheel 4, instead of a stationary element such as the guide 3, the engagement head 107 is formed by a flange 107a joined to the star wheel 4 along its axis of rotation by means of a counter-flange 107b and bolts 107c or the like, and the cylinder 11 is inserted inside a tube 120 with respect to which the cylinder 11 is able to rotate by means of ball bearings 121.

As illustrated in FIGS. 4a and 4b, the locking device operates as follows:

In normal working conditions (FIG. 4a) compressed air is not supplied to the locking device and consequently the spring 16 pushes the piston 13 downwards, bringing the annular shoulder 13a opposite the balls 11c which are pushed radially outwards and engage with the groove 7b in the head 7 of the threaded shank 6b joined to the guide 3 (or the star wheel 4), locking them in position.

Should it be necessary to change the guide 3 (or the star wheel 4) in that the shape and/or the size of the bottle has changed, compressed air is supplied to the duct 11c of the column 11 so as to push the piston 13 upwards against the thrusting action of the spring 16. Once it has reached the end of its travel path, the piston positions the inset seat 11d opposite the balls 11c, thus freeing the balls 11c which are able to retract, freeing the head 7 of the screw 6b and allowing raising of the guide 3 for replacement thereof.

Once the guide has been replaced, the air supply to the cylinder 11 is interrupted, thus allowing the spring to bring back the piston 13 into the initial position and hence restoring the thrust in the radial direction on the balls 11c which, emerging from the respective seats, engage with the annular groove 7b in the head 7, the inclined sides of which result in breaking down of the radial thrusting force into forces of the axial type which retain the said head of the screw in this direction.

It is envisaged, moreover, that a collar of soft material 13d is arranged around the piston 13 and in the region of the seat 13b, said collar, when coming into contact with the balls 11c during disengagement, preventing entry of condensate or the like inside the engaging device.

I claim:

1. A machine for filling containers comprising:
   a base;
   a plurality of replaceable elements for guiding and moving containers mounted on said base;
   respective support columns on said base connected to and carrying said elements, each of said elements having a locking member assigned to the respective column; and
   automatic devices coaxially received in said columns for rapidly locking and releasing said locking members, thereby selectively retaining said elements on said base and disengaging said elements for replacement.

2. The machine defined in claim 1 wherein said locking members each include a threaded element joined to a cup engageable by the respective automatic device.

3. The machine defined in claim 2 wherein each of said cups has an annular seat with inwardly diverging sides adapted to receive balls on the respective automatic device.

4. The machine defined in claim 1 wherein each column is mounted on bearings in a respective tube joined to said base.

5. The machine defined in claim 1 wherein said automatic devices are pneumatic devices.

6. The machine defined in claim 5 wherein each of said columns has a coaxial duct supplying compressed air to a chamber within the respective column and coaxial therewith.

7. The machine defined in claim 6 wherein each of said columns has radial holes connecting the respective chamber to the exterior.

8. The machine defined in claim 7 wherein said automatic devices include sliding members received in said holes.

9. The machine defined in claim 8 wherein said sliding members are ball elements.

10. The machine defined in claim 8 wherein each of said automatic devices includes a piston movable coaxially inside the respective chamber.

11. The machine defined in claim 10 wherein each of said pistons has an annular edge acting on the sliding members of a respective automatic device.

12. The machine defined in claim 11 wherein each of said pistons has an annular seat adjacent a respective annular edge.

13. The machine defined in claim 12 wherein each of said pistons has a coaxial cavity passing through the respective piston.

14. The machine defined in claim 13 wherein each of said cavities forms a widened coaxial compartment.

15. The machine defined in claim 13 wherein each of said automatic devices comprises a piston pin extending in the respective cavity.

16. The machine defined in claim 15 wherein each of said piston pins has a female thread engaging a male thread on a shank of a disk closing the respective chamber.

17. The machine defined in claim 16 further comprising resilient means coaxially around each piston pin and adapted to act between a surface of the respective piston and said disk.

* * * * *